US005649234A

United States Patent [19]

Klappert et al.

[11] Patent Number: 5,649,234

[45] Date of Patent: Jul. 15, 1997

[54] METHOD AND APPARATUS FOR ENCODING GRAPHICAL CUES ON A COMPACT DISC SYNCHRONIZED WITH THE LYRICS OF A SONG TO BE PLAYED BACK

[75] Inventors: Walt Klappert, Topanga; Max Garbutt, Westlake Village; Michael Lehman, Carmel, all of Calif.

[73] Assignee: Time Warner Interactive Group, Inc., Burbank, Calif.

[21] Appl. No.: 271,184

[22] Filed: Jul. 7, 1994

[51] Int. Cl.[6] .............................. G06F 15/00; G09B 5/00

[52] U.S. Cl. ....................................... 395/806; 434/307 A

[58] Field of Search ................................... 395/154, 144, 395/155, 161, 153; 434/307 A

[56] References Cited

U.S. PATENT DOCUMENTS

| | | | |
|---|---|---|---|
| 4,942,551 | 7/1990 | Klappert et al. | 395/800 |
| 4,992,886 | 2/1991 | Klappert | 358/342 |
| 5,194,683 | 3/1993 | Tsumura et al. | 84/600 |
| 5,208,413 | 5/1993 | Tsumura et al. | 434/307 A |
| 5,243,582 | 9/1993 | Yamauchi et al. | 369/32 |
| 5,247,126 | 9/1993 | Okamura et al. | 434/307 A |
| 5,280,572 | 1/1994 | Case et al. | 395/144 |
| 5,282,037 | 1/1994 | Eguchi et al. | 358/182 |
| 5,410,097 | 4/1995 | Kato et al. | 84/610 |
| 5,440,677 | 8/1995 | Case et al. | 395/154 |

FOREIGN PATENT DOCUMENTS

| | | | |
|---|---|---|---|
| 0488684A1 | 6/1992 | European Pat. Off. | G04N 5/76 |
| 0493648A1 | 7/1992 | European Pat. Off. | G10H 1/00 |
| 0498927A3 | 8/1992 | European Pat. Off. | G10H 1/00 |

*Primary Examiner*—Heather R. Herndon
*Assistant Examiner*—Joseph R. Burwell
*Attorney, Agent, or Firm*—Blakely Sokoloff Taylor & Zafman

[57] ABSTRACT

A method and apparatus for simplifying the steps needed to produce a graphical cue to words being displayed as they are to be sung by a performer such as in Karaoke. The production of a CD-Graphics (CD-G) product containing compact disc ("CD") audio accompanied with a visual presentation of the lyrics is facilitated. In the end CD-G product, the lyrics are displayed on a CRT as white letters against a chroma keyed background (usually blue). An operator is able to precisely control the appearance of the lyrics of the display and the filling of the displayed lyrics in time with the music. The color of the fill can be specified e.g., to distinguish male solo or female solo or combination. The operator may also create display titles and other stylized graphical images for display during interludes where there is music and no lyrics. The operator may also specify the way in which graphical elements are put on the screen e.g., painted from left to right, right to left, spiral out from the center, etc.

2 Claims, 7 Drawing Sheets

METHOD AND APPARATUS FOR ENCODING GRAPHICAL CUES ON A COMPACT DISC SYNCHRONIZED WITH THE LYRICS OF A SONG TO BE PLAYED BACK

BRIEF SUMMARY OF THE INVENTION

The present invention is a method and apparatus for simplifying the steps needed to produce a graphical cue to words being displayed as they are to be sung by a performer such as in Karaoke. Karaoke which means "empty orchestra" is an increasingly popular form of entertainment where music is played sans vocals but accompanied with a display of the song lyrics so that a Karaoke performer can sing along. Various techniques are used to cue the performer to the timing of the lyrics. One commonly used technique is a yellow fill wherein the letters of the words of the song appearing on the display, initially white, change to yellow at the appropriate time. Another method involves a bouncing ball which bounces on the phrase to be sung. However, whatever technique is utilized, the creation of properly timed cues is a time consuming, labor intensive task which generally requires a substantial amount of experience to become proficient.

The present invention is a system which facilitates the production of a CD-Graphics (CD-G) product containing compact disc ("CD") audio accompanied with a visual presentation of the lyrics. In this connection, CD-G is an industry standard format whose specifics are published by Philips in what is known as the "yellow book." In the end product, the lyrics are displayed on a CRT as white letters against a chroma keyed background (usually blue). Chroma keying refers to a video technique which creates a video image which is a composite of video images from two sources. In this manner, a specific color on the CRT display is replaced with another video source e.g., an image of the Karaoke performer. The invention allows an operator to precisely control the appearance of the lyrics of the display and the filling of the displayed lyrics in time with the music. The color of the fill can be specified e.g., to distinguish male solo or female solo or combination. The invention also allows the operator to display titles and other stylized graphical images during interludes where there is music and no lyrics. The operator can also specify the way in which graphical elements are put on the screen e.g., painted from left to right, right to left, spiral out from the center, etc.

DETAILED DESCRIPTION OF THE INVENTION

Figure 1A:
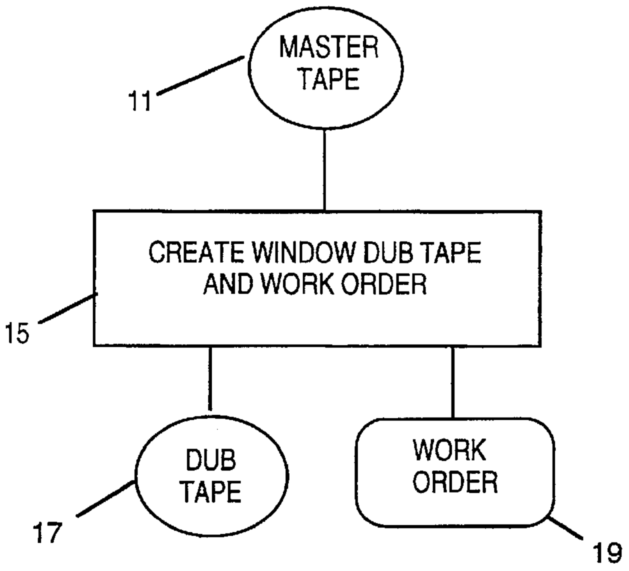
FIG. 1*a*–1*e* are block diagrams showing the flow of tasks necessary to practice the invention.
Figure 1B:
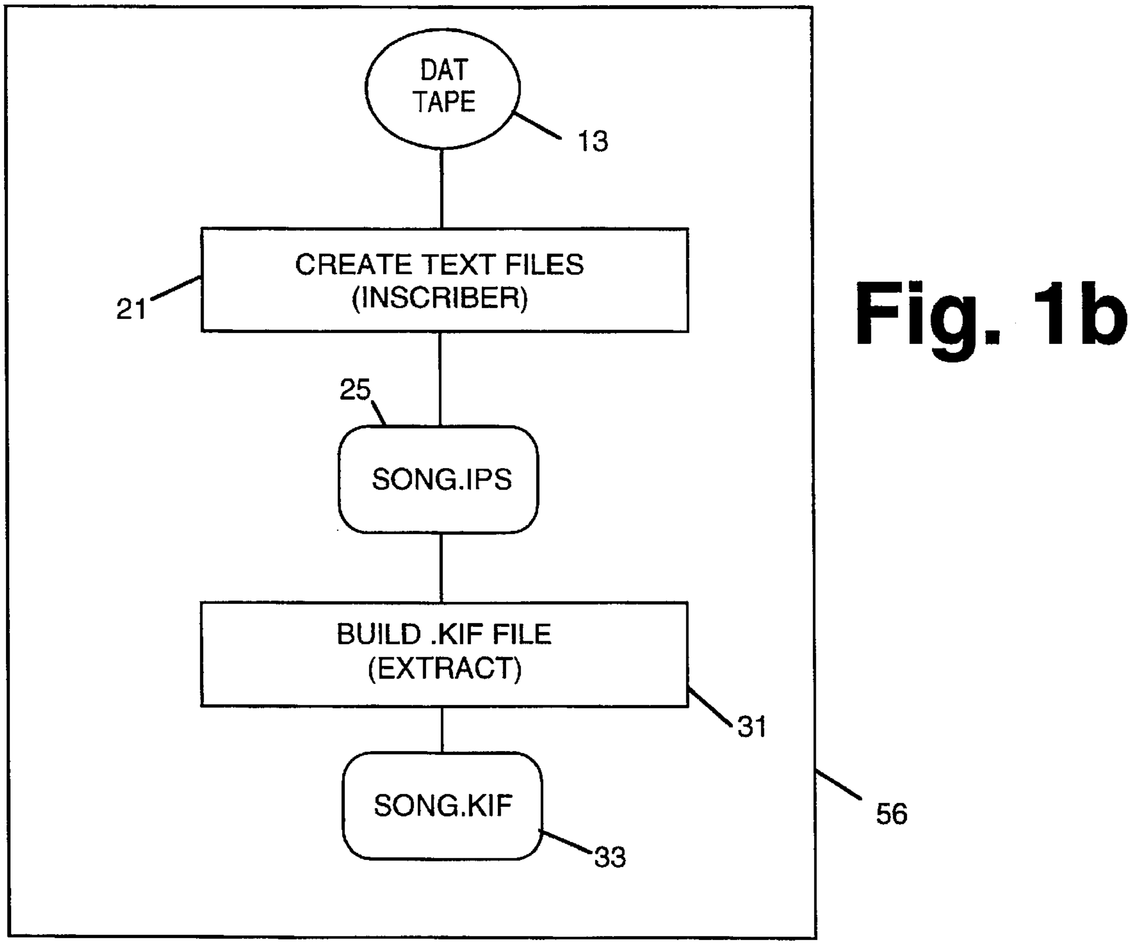
Figure 1C:
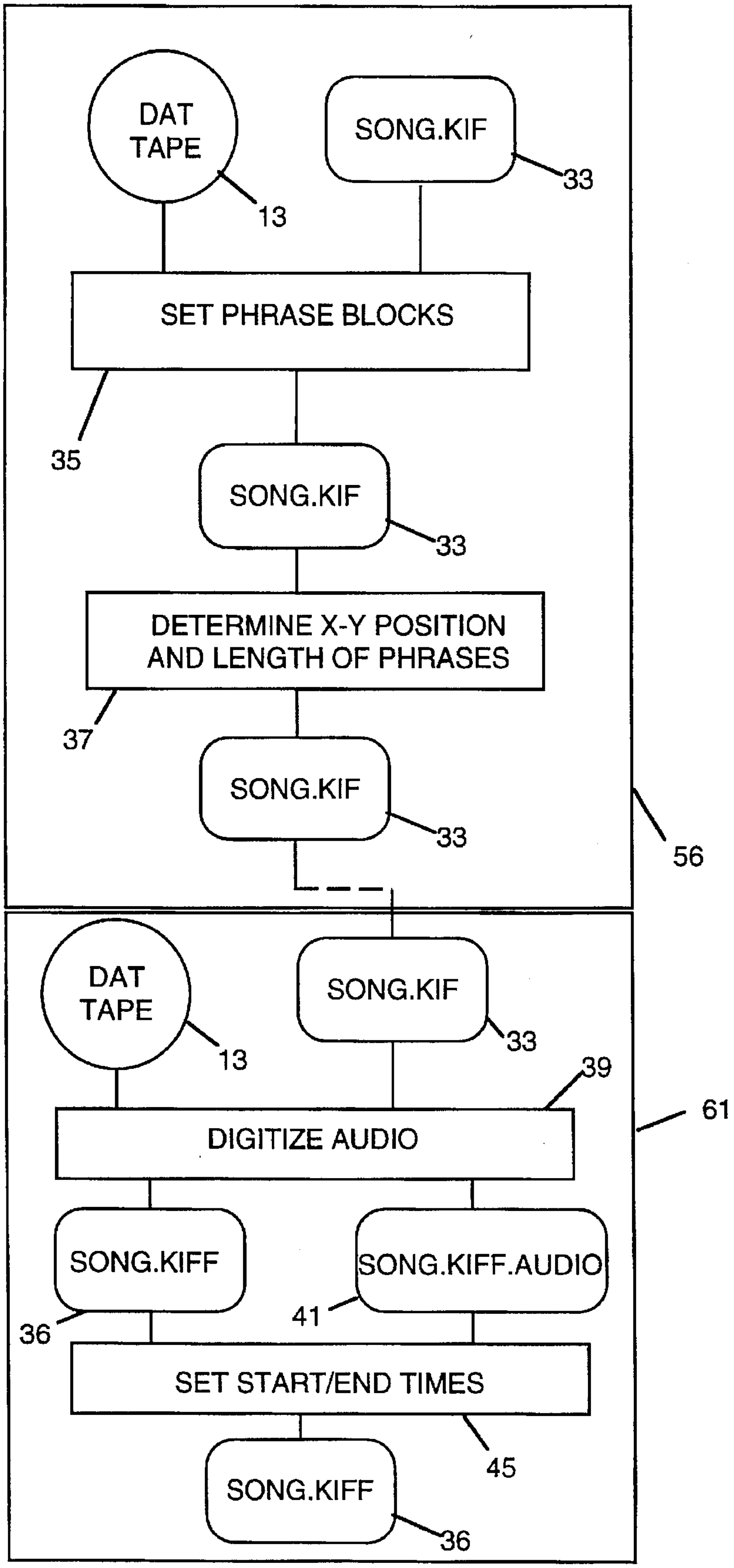
Figure 1D:
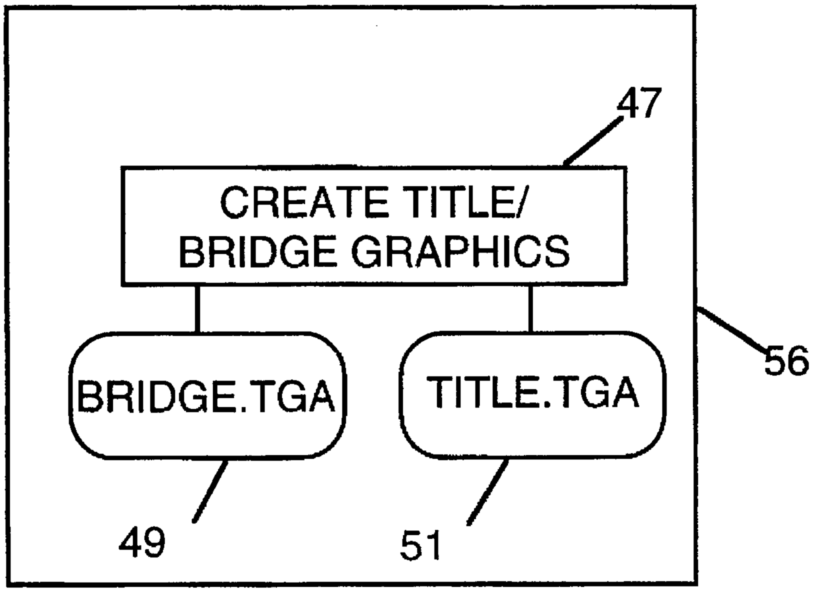
Figure 1E:
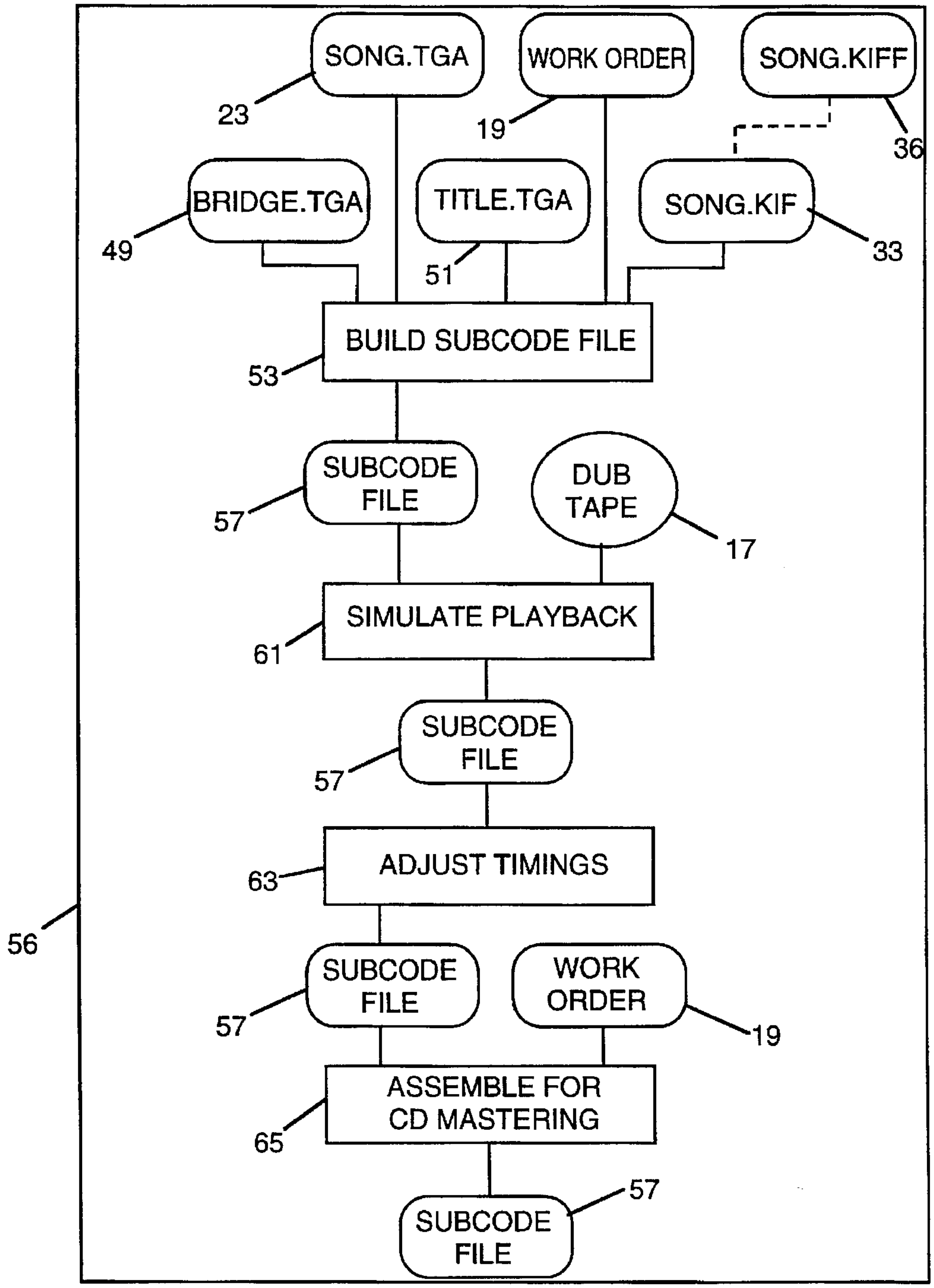

The present invention is a system which creates data on a CD-G disc which when played, generates an audio signal containing music accompanied with a visual display of the lyrics such that the lyrics are highlighted so as to be synchronized with the music. In this manner, files can be easily created by a non-skilled operator for use in a form of entertainment known as Karaoke in which a non-professional performer is able to sing the lyrics of popular songs.

The manner in which the operator specifies the various objects which make up the final CD-G product is through the construction of a number of files including:

(1) song.tga: A visual representation of the lyrics as they will appear on a CRT. Essentially, the data in the file is a binary image of the lyrics including font and style. The file is in a graphics format known as Truevision or TGA.

(2) song.kif: Initially an ASCII file of the lyrics from song.tga. Upon completion of the processing described herein, this file contains all the phrase timing, XY location, fill timing and color, graphics placement and graphics wipes.

(3) title.tga: Graphics file containing the song title and copyright notice for each song processed for inclusion on the final CD-G product;

(4) bridge.tga: An optional graphics file containing one or more graphics for musical interludes.

The files are created by various processing steps which are described below with reference to FIGS. 1*a*–1*e*, 2*a*, 2*b*, 3*a*, 3*b* and 3*c*.

(1) Master Tape 11 and DAT Tape 13

Master tape 11 is a ¾" digital tape in 1630 format with the musical background for the volume of songs which are going to make up the final CD-G product. Usually there are ten songs.

DAT tape 13 is a digital-audio tape containing scratch vocals. Scratch vocals are accurate but unpolished guides to the melody of the song. Although the finished product does not include any vocals, this tape provides the audio listened to by the operator in step (3) below so that the operator can properly synchronize the lyrics with the music and digitized in step (7) below.

These two tapes are created according to well known prior art techniques for other purposes which are not part of the present invention.

(2) Create Window Dub Tape 17 and Work Order 19 (Block 15)

The master tape is used to create a VHS high fidelity dub tape 17 and a work order 19 which is a disk file, typically stored on a floppy diskette. The work order specifies the start and end times for each of the songs. All time references are SMPTE i.e., mm:ss:ff (minutes, seconds and frames, where 30 frames=1 second). On the VHS dub tape 17, one audio channel has the musical background from master tape 11, the other audio channel is encoded with SMPTE time code. A visual representation of the SMPTE time code is encoded onto the video channel. The manner in which the window dub tape and work order 19 are created from master tape 11 in a sound studio is well known to persons skilled in the art.

(3) Create Text Files (Block 21)

A commercially available program (normally used for video titling) called INSCRIBER is used to create a text file of the song. The inputs to the INSCRIBER program are:

i) data from DAT tape 13 obtained by playing the DAT tape using a commercially available DAT player 26 through speaker or headphones 28-the operator listens to the words being played and types them using computer 56 using a text editor or word-processing program;

ii) GEN96.TGA (not shown): a Targa file representing the background for four (4) subcode screens including the CLUT (color lookup table) for the text to be entered. The four screens are each 96 pixels high, each having four rows of 24 pixels per row. This file is created by Template.c described below;

iii) BASE1.SLY (not shown) an INSCRIBER (the commercially available program used to create a text file of a song specifying the type face, point size, leading, kerning, etc. of the text to be entered. INSCRIBER (the commercially available program used to create a text file of a song) allows the operator to specify many of the artistic elements needed to build an esthetically pleasing text display such as typeface, kerning, spacing, etc.

The output of INSCRIBER program (the commercially available program used to create a text file of a song) is a set of files as follows:

i) a song.tga file 23 (Targa file). This is the graphic image of the song lyrics which will ultimately be converted for encoding on the CD-G disc;

ii) a song.ips file 25 (INSCRIBER Page Syntax) which contains Postscript-like statements used by INSCRIBER (the commercially available program used to create a text file of a song) to construct the Targa screen, i.e., the image displayed on monitor 42. In particular this file contains a line-by-line ASCII representation of the text strings representing the lyrics entered by the operator;

iii) a song.sly file (not shown) A file which contains all the screen layout information. Necessary for INSCRIBER (the commercially available program used to create a text file of a song), this file is otherwise unused.

The INSCRIBER program (the commercially available program used to create a text file of a song) uses GEN96.TGA which is produced by Template.c, a C language program described below for the building of generic templates for the Inscriber program. The user enters the desired pixel height of the characters to be input and the Template.c program builds a Targa file that consists of a chroma blue background with white tick marks placed along the right margin signifying the vertical limits to a screen referred to as the subcode screen which is a representation on monitor 42 of the image which will be produced by the subcode data when played back as a CD-G selection. The present invention uses four subcode screens each ninety-six pixels high. A CLUT (color look-up table) is built an appended to the upper right hand portion of the image but it is not used in the present implementation and could be omitted.

Template.c provides the following support functions:

BuildBlue—Builds a blue and black row on the monitor 42 representing the subcode screen's horizontal limits.

BuildBluePlus—As above but appends a white line marker to the right hand edge of the blue area on monitor 42 representing the vertical bound(s) of the phrases intended for a particular screen.

BuildClut—Builds the CLUT row (unused positions are black with high order bit set) above the topmost edge of the subcode screen (RGB monitor 42).

BuildBlack—Build a pure black row on the subcode screen (RGB monitor 42).

GetPixelHeight—Prompts the user to enter pixel height as a multiple to be multiplied by 12.

BuildGenericFile—

(i) Requests pixel height from the operator;

(ii) builds a template maximizing the number of lines based on the pixel height input by the operator;

(iii) creates and opens for writing a generic file named gen12.tga if 12 pixels/line, gen24.tga if 24 pixels/line etc.

(4) Build .KIF File (Block 31)

The song.ips file is used as input to a program 31 (Extract) which builds the initial version of a file 33 called song.kif in a format designated as Karaoke Interchange Format or .kif. The following is a detailed description of the Extract program defining the processing performed by block 31.

Extract is a program that runs on PC 56 that builds the initial version of the song.kif file. It does this by extracting the ASCII phrases from the song.ips file and inserting screen breaks every four lines (or less if there are blank lines). Screen breaks are separators (an asterisk generally followed by the file name) inserted into the song.kif file. Of course, if other four lines are reserved for text on the display, the screen breaks are inserted every N lines where N is the number of reserved lines. The format of the song.ips file is such that the desired phrases are enclosed within parentheses and followed by the word "show". A ProcessData function, described in detail below, performs this extraction. Since the song may not always use the four lines that are available on the screen, the Check4Blank function, described below, is invoked to make this determination and insert a screen break.

Extract Support functions

GetFileName—This function is called when there is an error in opening a file. It prompts the user for a file name to be used, and then checks to see if the file is an IPS file by checking the file extension.

Init—Gets the .IPS input file name from the user, and opens an output file with the same name, and .KIF extension.

Check4Blank—This function looks at the current line and the previous line from the .IPS file it is processing and determines if blank lines need to be inserted into the .KIF file. Blank lines need to be inserted when the lines from the song to be displayed for a particular display do not use the four available lines which will appear on the display. If so, it inserts the enough blank lines into the output file so that the total is four.

GetValue—This function extracts the value of the ASCII string which follows the "nul" string in the current line being processed, converts it from ASCII to decimal value, and then returns that value.

ProcessData—This function looks for a line from song.ips with both the word "show" at the end and a left parenthesis, then it extracts the text from the left parenthesis to where "show" appears, and sets a pointer to this new string. The string is then written to the output file. The file is parsed to see if any blank lines need to be inserted. After every fourth line (the last line of the file is an exception), an asterisk is added to the output file.

Figure 2A:
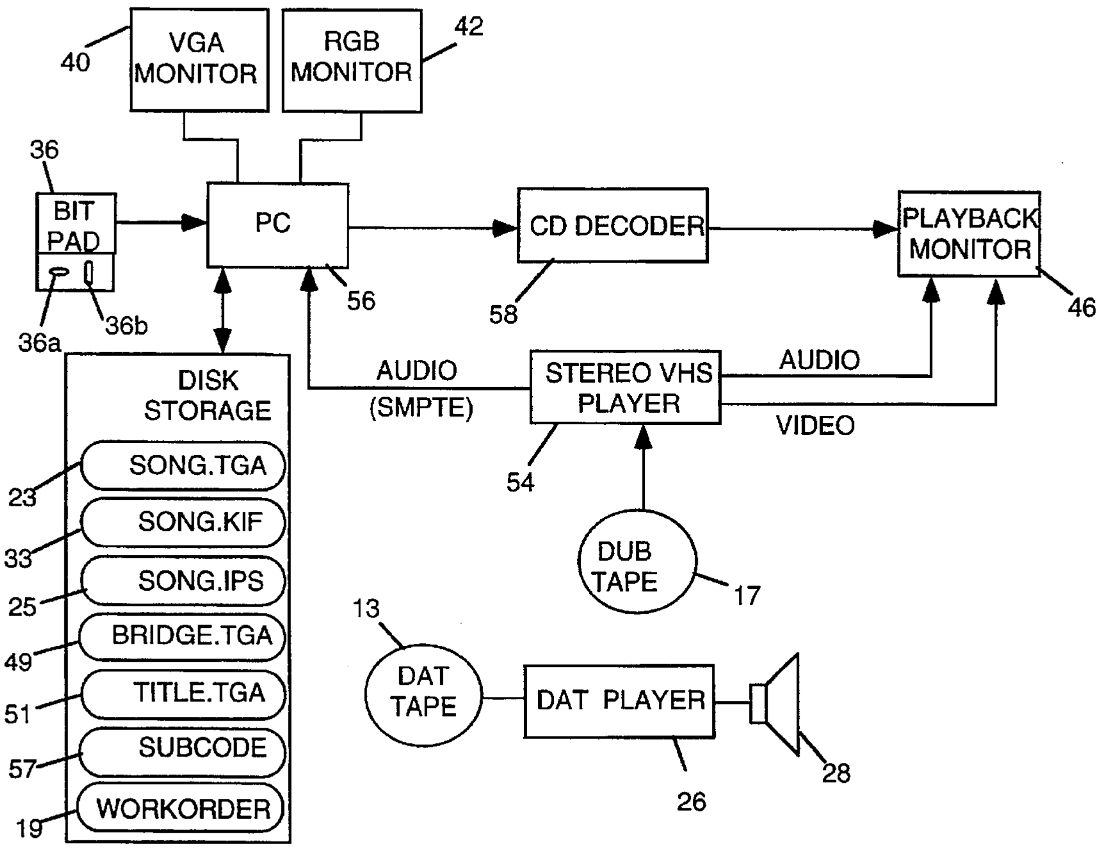
FIG. 2*a* and 2*b* are block diagrams showing the components used to create and playback a file which contains visual cues to lyrics.
Figure 2B:
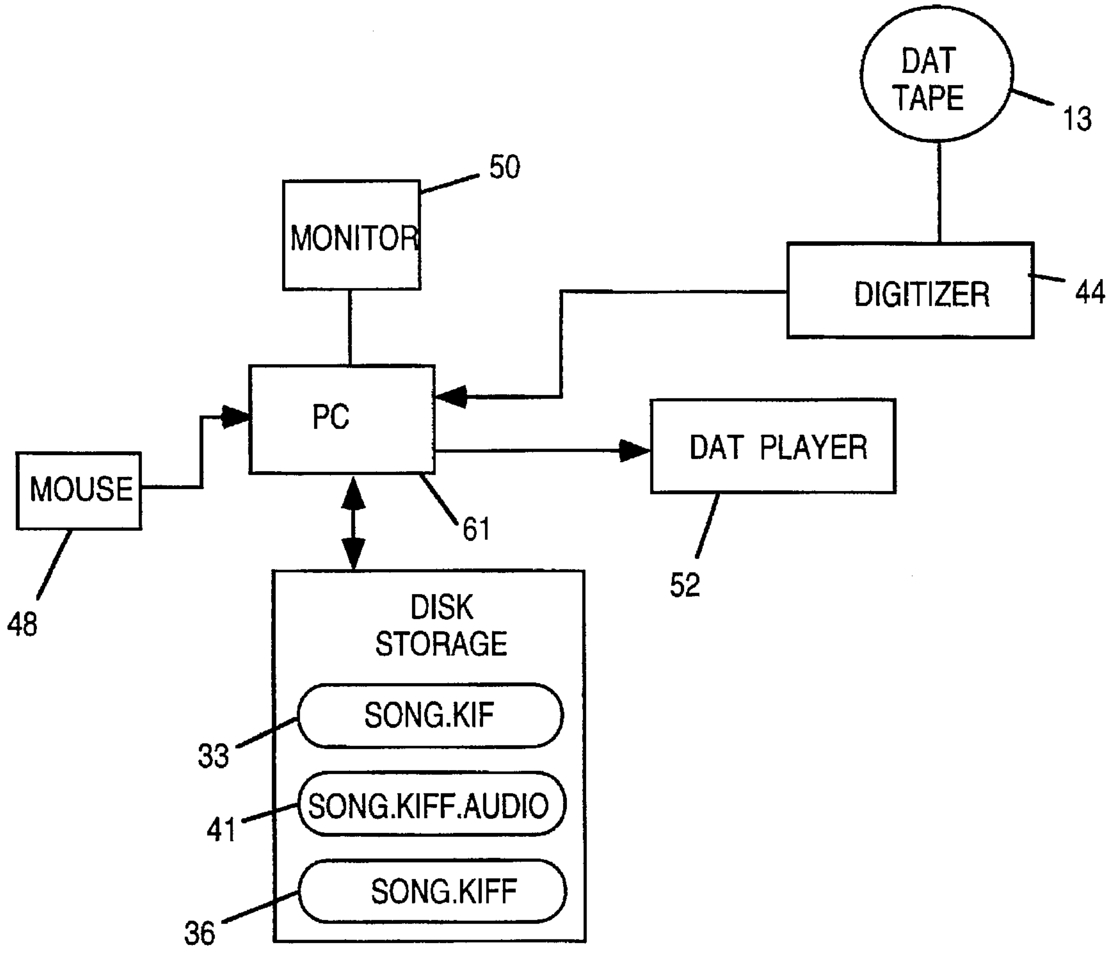
Figure 3A:
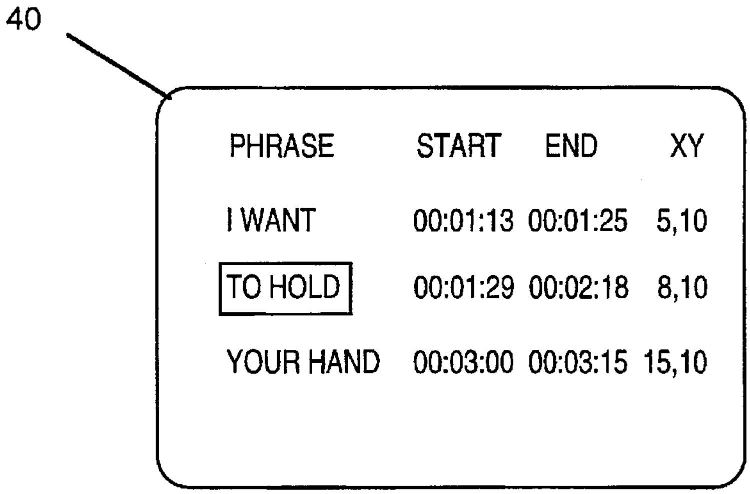
FIGS. 3*a*–3*c* are pictorial representations showing information displayed on monitors 40, 42 and 50 respectively.
Figure 3B:
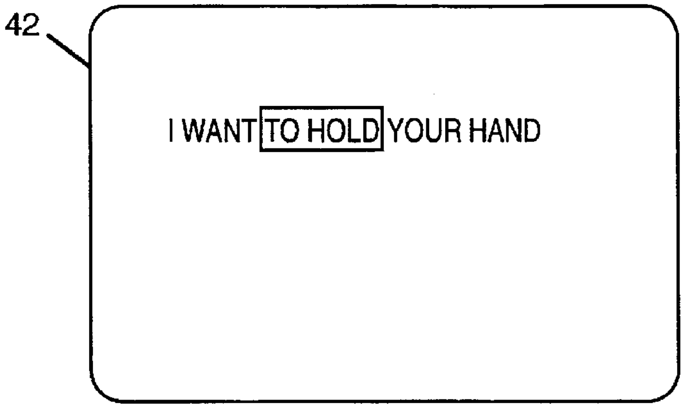
Figure 3C:
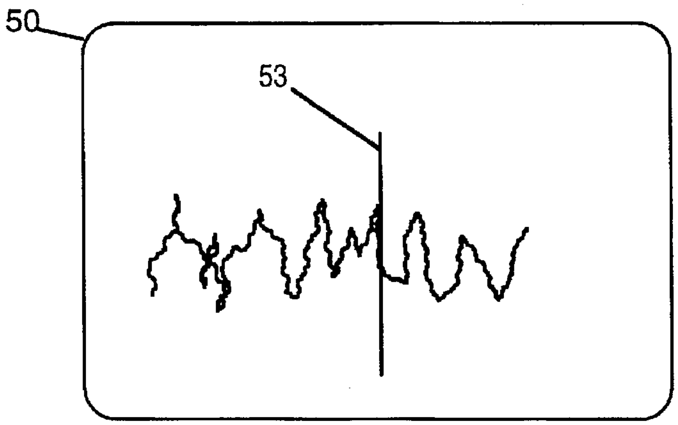

The functions and processing performed in create text files block 21 and build .kif file block 31 are performed using a readily available personal computer system including a personal computer 56 running MS-DOS as shown in FIG. 2*a*. A suitable personal computer system would be an IBM or compatible personal computer with a 80386 or higher processor, at least one megabyte of RAM and a forty (40) megabyte hard drive.

(5) Set Phrase Blocks (Block 35)

The song.kif file 33 created in step (3) is edited to set phrase blocks 35 using an ASCII editor to break up the lines of text into phrase blocks by inserting carriage returns and linefeeds after each block. A phrase block is a string of syllables that are sung without a break or pause as determined by the operator by listening to the DAT tape in step (3) or by listening to the DAT tape again in this step.

(6) Set XY Position Of Phrase And Its Length (Block 37)

The song.kif file 33 is then imported into a program called KED (Karaoke Editor). Using bitpad 36 and the dual monitor displays 40 and 42 shown in FIG. 2*a*, the bitpad is setup so that the left half of the bitpad maps into the VGA display 40 and the right half of the bitpad maps into the display on monitor 42 i.e., moving the stylus about the left half of the bitpad causes a corresponding movement on the VGA display 40 and moving the stylus about the right half of the bitpad causes a corresponding movement on the Targa display 42. A suitable bitpad is a Summasketch II available from Summagrahics. The bitpad includes a selector button 36*a* and a stylus 36*b*. Moving the cursor to the VGA display 40 by moving the stylus to the left side of the bitpad and pressing the selector button 36a causes the phrase to be selected. The selected phrase is displayed in reverse video on monitor 40. The KED program automatically retrieves the song.tga file 23 that contains the selected phrase. The name of the song.tga file follows the screen break separator character (*) in the song.kif file. Moving the cursor to the display (RGB monitor 42) by moving the stylus to the right side of the bitpad, the operator moves the cursor to the left edge of the phrase as it appears on the monitor 42 by moving the stylus over the bitpad. Pressing the selector button 36*a* fixes the left edge of a wire frame over the text. Moving the cursor to the right by moving the stylus to the right over the bitpad until the desired phrase is enclosed in the wire frame and pressing the selector button 36*a* causes the frame to turn into a box with the text in reverse video. This box remains for a second and half. During this time, the operator verifies that exactly the right amount of text has been captured. If not, the phrase is reselected by moving the cursor to the VGA display 40 and reselecting the phrase. Otherwise the next phrase in sequence is highlighted on VGA display 40 and the operator repeats the process. The mechanism by which the next phrase is highlighted is described below with reference to the Process TGA function. The upper left corner of the rectangle on monitor 42 determines the starting point for the phrase. The relative position of this point within the monitor 42 determines the position for the phrase on the subcode screen, i.e., the ultimate playback screen hooked up to the CD-graphics player. The right hand edge determines the length of the phrase in pixels. The height of the rectangle equals the height of the text including leading in pixels. When done, the operator saves the song.kif file 33 which contains records specified by the C structure:

```
typedef struct {
char   targafn[9];      // Targa file name
char   wipefn[9];       // Wipe file name
int    screenbrk;       // NZ => screenbreak
int    graphics;        // NZ => graphics
char   voice;           // M, F or blank
int    targstart [2];   // monitor 42 start coordinates (x,y)
int    targend[2];      // monitor 42 end coordinates (x,y)
int    font[2];         // font coordinates (x,y)
long   phrt[2];         // start, end times (in frames)
int    seqnum;          // sequence number
char*phrase;            // phrase
} KIFREC;
```

targafn[9] stores the Targa file name entered by the user during editing of the song.kif file.

wipefn[9] stores a Wipe file name created by the user selecting a wipe file from a list of possible wipes (e.g., left, right) and entering it into the song.kif file.

screenbrk is set to true (non-zero) if the song.kif record contains a line preceded with an asterisk. (initially placed there by Extract.c), otherwise it is set to false (zero).

graphics is set to true (non-zero) if the record contains the word "GRAPHICS" placed there by the operator, otherwise it is set to false (zero).

voice stores a single character (M, F or blank) input by the operator by selecting a phrase and typing M, F or space.

targstart[2] stores the x, y coordinates of the start of the phase on monitor screen 42 when the operator places a wire frame shaped cursor about the phrase on monitor 42.

targend[2] stores the x, y coordinates of the end of the phrase on monitor 42 set when the operator places a wire frame about the phrase on monitor 42.

font[2] stores the x, y coordinates of the start of the phrase on the monitor 42 when the operator places the wire frame on the phrase on the monitor 42.

long phrt[2] stores a begin and end time (in frames) for the phrase. It is set by the operator when operating the synchronizer software on computer 61.

seqnum stores an index corresponding to the phrases positioning in the file created. It is set by the software when the file is read.

char*phrase stores an ASCII representation of the phrase selected when the operator places the wire frame shaped cursor on the phrase on monitor 42.

Functional description of the KED program

KED is the program that runs on PC 56 that allows to the operator to:

(1) establish the coordinates of the graphical images which represent the songs phrases;

(2) set the color of the fill by specifying the voice; M, F or space;

(3) build the subcode file and play it back in synchronization with the music;

(4) adjust the timings of the phrases as required.

KED is implemented as a set of C language modules as follows:

main

Contains the operating loop that reads bit pad 36 and the PC 56 keyboard which in turn invokes the other modules. The main functions are:

(1) read/write the .kif file;

(2) provide the operator the support required to place rectangles around the phrases displayed on the monitor 42 that correspond to those displayed on monitor 42;

(3) build the subcode file from the data supplied;

(4) playback the subcode with or without synchronization to an external SMPTE source;

(5) provide support to allow the operator to modify the start/end times for specific phrases or for the entire file;

Additionally the operator can change the expansion factor. This is a number used to modify the phrase times brought over from the Digitizer/Synchronizer platform. It also allows a Com port on PC 56 other than Com port 1 to be used for the bit pad.

Startup Support

At startup, the screen is cleared and BuildVgaScreen is called which in turn calls BuildBox to build a frame with vertical scroll bars. The extended character set is used to put up the graphical elements.

General Support

A number of functions are used to display status and error messages:

ClrMsg—blanks line 24

DispMsg—Calls ClrMsg then displays a passed string at line

DispMsgnWait—Does DispMsg plus "Press any key.." then waits for a keystroke then clears line Drivers that provide communication with the bit pad interface are:

write_rs232_ibm—sends a byte read_rs232_ibm—reads a byte read_bitpad—sends command string and gets response check_pad—interprets returned string into XY position and button and pen status Read File Command When the operator requests Read file, the function ReadKifFile is invoked. If that operation is successful, DispKifFile is invoked to put up its VGA image. The tga.c function, GetPic, is called to put up the image on monitor 42.

Read Kif File

This function queries the operator for the .kif file name; initializes the array in memory which has a maximum of PHRMAX entries; then reads in the .kif file. Each line of data (except phrases) is preceded by a special symbol according to the following scheme:

```
Optional header:
   $Smm:ss:ff      SMPTE "in time"
   $Vmm:ss:ff      SMPTE vocal start time from window dub
Optional title record:
   *tga file name
   ;wipe
   GRAPHICS
n phrase entries (with optional interposed graphics entries):
   *tga file name (if screen break)
   -voice    M or F or not present
   [x,y phrase begin monitor 42 coordinates
   ]x,y phrase end monitor 42 coordinates
   @x,y subcode begin coordinates (row, col)
   >mm:ss:ff Amiga phrase fill start time
   <mm:ss:ff Amiga phrase fill end time
   #seq num  sequence number
   phrase    ASCII phrase
```

Time entries of 99:99:99 are not read in but are treated as null entries.

Display Kif File

This function sets up the window for displaying the kif data; clears it then repeatedly invokes DispLine to display the phrase and related data.

Display Line

Called with the screen line number, the index of the phrase in the array and a display control switch, this function puts up the phrase, the start and end times and the subcode coordinates. Depending on the display switch one of the fields is displayed in reverse video.

Save Kif File

Whenever the operator requests Save file, this function is invoked. It writes the header data followed by phrase data (and graphics data if present). If there are no start and end times the value written to disk is 99:99:99. Following a successful write, kif_saved is set to 1.

Bitpad interface

In the top of the processing loop in main, a call to check_pad returns a flag specifying the pen (or puck) location on the bit pad and whether the pen is up or down. One of three functions is invoked: ProcessVga, ProcessTga or ProcessNone. A horizontal stripe comprising the middle third of the bit pad is the active area with the left half representing the VGA screen and the right half the TGA screen. There is a vertical band separating the two regions.

Process VGA

This function updates the cursor then checks the pen down status. If the pen is down then depending on the location of the cursor an action is taken by invoking one of the support functions.

| location | function |
|---|---|
| text area | SelectPhrase |
| time area | SelectTime |
| up arrow | ScrollDown |

-continued

| location | function |
|---|---|
| upper half of scroll bar | PageDown |
| down arrow | ScrollUp |
| lower half of scroll bar | PageUp |

Process VGA Support

The functions which perform the actions specified above are: DeselectPrev—Deselects a phrase if one is selected; deselects time if selected and removes the frame/box on monitor 42 if present.

The following functions move the display window if possible then call DeselectPrey:

ScrollUp

PageUp

ScrollDown

PageDown

SelectPhrase—Sets phrase_sel_sw, phrase_ndx and highlights the selected phrase. Reads and displays the associated Targa file if necessary. Unhighlights the previous selection if necessary.

SelectTime—Sets time_sel_sw, phrase_ndx and highlights the selected time field.

Process TGA

The main purpose of this function is to allow the operator to build a wire frame rectangle that surrounds the text that corresponds to the selected phrase on the VGA display (monitor 40). Initially there is no frame (start_set=0) so the cursor is displayed as a vertical bar. If the pen is pressed down, this establishes the font row (start_row) and left hand edge (start_col) of the wireframe rectangle. Start set is set to one. When start_set is non-zero and the cursor is to the right of the starting point, a wire frame is displayed with right hand edge corresponding to the cursor's x-location. If the pen is pushed, the wireframe becomes a solid box (i.e. the text enclosed is displayed in reverse video). The starting and ending coordinates of monitor 42 of the box are written to the phrase array as well as the starting font coordinates. The system clock is read and stored in bios_build_time (initially=−1).

Each time ProcessTga is called bios build time is checked. If it is positive and the current time exceeds it by the variable DELAY, which represents the time in timer ticks, then AdvanceSelection is called to automatically advance to the next phrase. Bios_build_time is then reset to −1. This allows the operator to proceed sequentially from phrase to phrase without moving to the VGA display to select the next phrase.

If the operator presses the pen when the solid box is displayed, the box disappears, start_set is zeroed and the whole process resumes.

Process TGA Support

AdvanceSelection—moves to next phrase, scrolling if necessary.

XorSolid—fills in selected rectangle

XorFrame—puts up a wire frame on monitor 42

XorTGAcur—puts up an I-bar cursor on monitor 42

Process None

When the pen is not in the VGA or TGA region, this function makes sure that the cursor is not displayed.

Building the Subcode Data File

Once start/end times have been set for each phrase and the start/end coordinates on monitor 42 have been set (and by implication the font coordinates) the operator can request Build BIG file. If successful the end result of the process is a binary file named BIG that contains the CD-Graphics commands necessary to display the title (and any other purely graphical images) and text of the song along with CLUT changes to cause the text to yellow fill in time with the song.

Set Time Offsets

This is the first function invoked by a build request. It displays the current start time stime0) and allows the operator to change it. stime0 is the SMPTE "in time" taken from the mastering order supplied with the master 1630 tape. It then displays the window dub time (vtime0) to allow the operator to change it. The window dub time is the SMPTE time when the first vocal begins. Pressing the enter key without a preceding value causes the displayed value to be accepted.

Preprocess Build

Since the build process can take a minute or so to run and an error causes the process to abort, this function is called to verify that (1) all phrases have start/end times; (2) there are no overlapping times; and (3) the ending graphic has start/end times.

Build Big File

If PreprocessBuild runs successfully, this function gets called. The size of the BIG file (subcode file 57) is calculated. This file is a series of 24-byte packs with 10 packs in a frame, 30 frames in a second. When pressed onto the CD-G disc only the low order 6 bits of each byte are used. But for ease of construction the upper two bits are carried along as excess baggage. The file is created and zeroed.

The build loop is now entered where each element in the phrase array (rec[]) is processed in sequence. If the element is a graphical one, PutUpGraphics is called which returns the index of the next element to process. In this way PutUpGrahics is repeatedly called until a non-graphical element is found. Then YellowFillScreen is called. This function loads the packs with the XOR packs necessary to perform yellow fills for an entire screen. The position in the big file is determined by the time of the phrase. The portion of a frame used for this purpose is determined by the velocity of the fill. At the same time the mode flag is set(=FILL) so that as packs are written a bit map array of used packs (packmap[]) is updated. PutUpTextScreen is then called and its supporting functions set the mode flag (=PUTUP) so that all the available bandwidth (as determined by the packmap[] array) is used. On return from PutUpTextScreen the index into rec[] is pointing at the next element to process and the loop is repeated. On each path through the loop the keyboard is polled to see if ESC has been pressed and if so the variable sw is set to NG and the build loop is exited. If the variable sw is not set to NG, a seek to the end of the last item put up plus 15 frames is made and either FadeToBlue or FadeToBlack is performed. The file is then closed.

Build Big File support

PutUpGraphics—After determining the start time for the graphic and its position in the file, a check is made to insure that there is sufficient time for the graphic. Then the TGA file and the wipe file are loaded. The wipe file is read into an array then decoded to represent the order in which the fonts are painted onto the display. The CLUT for the graphic is read from the upper left hand corner of the Targa file. The CLUT is loaded and a stup (screen and border preset) is performed. The wipe row and column arrays are then used to write the graphic fonts to the big file. Depending on whether the next screen is text or graphics, the CLUT is set to the border color and a stup is performed.

mxputpack—Adds the parity codes to the font pack and writes the data to the big file at the current file pointer. If mode=PUTUP, uses maximum available bandwidth based on packmap[]. Keeps track of pack ordinality, adjusting the file pointer so that screen fills are at (10-bandwidth). The mode parameter determines the placement of the packs:

| | |
|---|---|
| PUTUP | if putting up the screen |
| SPCL | if ignoring bandwidth |
| FILL | if doing yellow fill |
| SKIPFRAME | if doing yellow fill and need to skip to next frame |
| SKIPPACK | if doing yellow fill and need to skip to next pack |

If performing a fill calls SetPackMap to update packmap []. SetPackMap—Sets the appropriate bit in packmap[] where:

bit 0 set→pack 9 used
bit 1 set→pack 8 used
bit 2 set→pack 7 used
bit 3 set→pack 6 used
bit 4 set→pack 5 used
bit 5 set→pack 4 used
bit 6 set→pack 3 used
bit 7 set→pack 2 used
bit 8 set→pack 1 used
bit 9 set→pack 0 used NextAvailPack—Called from mxputpack to read packmap[] array and performs a seek to the next available pack.

putfont—Writes the font data necessary (FONT WRITE pack and up to 3 XOR-FONT packs) for the given font row and font column. The font image data is encoded from the image on monitor 42 at the given location. Inputs :

"fontrow" is the font row (0–17).

"fontcol" is the font column (0–49).

"xloc" is the x-location on monitor 42.

"yloc" is the y-location on monitor 42.

(0,0) is lower left hand corner of monitor 42.

Calls mxputpack to write the data to the big file.

matchclut—Returns the CLUT position with color value closest in RGB-space to the passed values.

clrpack—Clears the pack data structure "pack" to zeroes, and sets the mode/item byte to the given value.

parityinit—Initializes the parity matrices for subcode generation. Used by mxputpack mult—Called from parity init to perform parity calculations. SetScreenStartAdr—Sets bfadr=the starting position (in bytes) in the big file for putting up the screen. Places the initial write as close as possible to the previous fill but not more than 2.5 seconds before the onset of the yellow fill.

getclut—Samples a region of the monitor 42 display to get the 16 colors for a CLUT and sets cred[], cgreen[] and cblue[] arrays.

LoadClut—Using the cred[], cgreen[] and cblue[] arrays two packs are written to perform the setting of the CLUT.

Stup—Performs a memory and border preset

FadeClut—Puts out a sequence of 16 CLUTs starting with the current CLUT and fading to the fixed CLUT specified by credend[], cgreenend[] and cblueend[]. The intermediate CLUTs are each 1/16 of the way from the current CLUT to the ending CLUT. Writes 2 CLUTs/frame.

FadeToBlue—Sets the end CLUT to chroma blue (1,1,5) and calls FadeClut.

FadeToBlack—Sets the end CLUT to black (0,0,0) and calls FadeClut.

YellowFillScreen—Called from BuildBigFile with the index of the rec[] element which represents the first phrase of a new screen, this function zeroes pacmap[] array then sets the screen start address. It then calls YellowFillPhrase until a screen break is encountered. If there more than 5 seconds from the end of the last fill to the start of the next screen, a FadeToBlue is performed. YellowFillPhrase—Called with the index in rec[], this function calculates:

(a) fill rate; aborts if rate exceeds 12;

(b) fill atom (1, 2, 3, 6 or 12 cols. per frame);

(c) number of cols.;

(d) starting position in the big file.

Then writes the XOR packs to the big file to do the yellow, purple or turquoise fill. Sets mode so that mxputpack sets bits in the packmap[] array. The fill packs always occupy the last 2n packs of the frame.

PutUpTextScreen—Sets the starting position in the big file for putting up the screen. Places the initial write as close as possible to the previous fill but not more than 2 seconds before the onset of the yellow fill. Calls SetTextClut, LoadClut and Stup functions to initialize the screen then falls into a loop where repeated calls to PutUpPhrase moves the graphical data from the targa image on monitor 42 to the big file. The loop concludes when a screen break is encountered.

PutUpPhrase—Uses putfont to write the fonts to the big file to put up the 4 color screen. Writes them as double high fonts left to right.

SetTextClut—Loads the CLUT component arrays cred[], cgreen[] and cblue[] with the fixed colors:

blue, black, gray, white blue, black, gray\blue, yellow blue, black, gray\green, orange blue, black, gray\red, turquoise The first group is used for the white text with black and gray edges on a blue background. The next three are used for XORing to achieve yellow, orange and turquoise respectively.

Playing back the subcode data file

Verification of the BIG file is done by playing it. This is done by selecting Play from the menu or pressing Alt-P. The former plays with sync i.e. play begins at the currently selected phrase on the screen when the external source of SMPTE coincides with that of the selected phrase. Play with sync also allows entry of a budge time i.e. an increment (positive or negative) which changes the start time of the play back. Alt-P causes playback without sync and without a budge. It starts playback at the selected point but does not wait for an external SMPTE source. Once play has begun the process is identical in both cases. Playrange() manages the play by repeated calls to loadbuf().

Playback Support

SetPlayBegin—Displays current budge time and allows re-entry allows playback from selected phrase.

SetPlayBegin2—Used by hot key playback. Allows playback from selected phrase.

ReadAdrien—Reads the code from an Adrienne board which is an interface board in PC 56 which converts SMPTE data from VHS player 54 as further described below with reference to simulate playback block 61. The board is available from Adrienne Electronics Corp. of Nevada City, Calif. as its model no. PC-LTC/RDR.

getsmpte—Interface to ReadAdrien: returns when valid SMPTE read or keystroke entered syncplayback—Prompts operator, then reads Adrienne board for SMPTE time until it exceeds startime plus budge.

playback()—Plays back from "begtime" till end of file or ESC key hit. This function opens the big file, seeks to the begtime position then invokes playrange.

playrange—Initiates and sustains playback using a block of contiguous memory as two buffers.

loadbuf—Reads the big file adds the sync bytes and performs the interleave required by the subcode decoder.

movinter, clearinter interleave, scramble—These functions perform the interleaving required for the graphics decoder. startdma, stopdma, waitforhalf—These functions provide support for the DMA operation of a PC 56 interface to the graphics decoder. This interface, an example of which is shown in FIG. 3 of U.S. Pat. No. 4,942,551, takes bytes of subcode data which have been loaded into RAM of PC 56 from subcode file 57 and using a serial to parallel shift register, loads a buffer with R, S, T, U and V subcode data, which data is provided to CD decoder 58 for playback on playback monitor 46.

Functional description of tga.c

Tga.c is C source code for a library provided by Truevision to allow programmers to interface with the Targa video adapters. The principal functions used by KED are GetPic, PutPic, GetPix and PutPix and they are described below.

GetPic—Opens a .TGA file, reads the Targa picture and displays it on the Targa monitor 42. The coordinates of the displayed picture can be specified.

PutPic—The converse of GetPic, this function writes a .TGA picture file from the specified region of the display on monitor 42.

PutPix—Puts the pixel value to monitor 42 at the specified x, y position.

GetPix—Gets the pixel from the monitor 42 screen at the specified x, y position.

The functions and processing performed in block 35 and 37 are performed using a readily available personal computer system such as a personal computer 56 running MS-DOS as shown in FIG. 2*a*. A suitable personal computer system would be an IBM or compatible personal computer with a 80386 or higher processor, at least 2 megabytes of RAM and a forty (40) megabyte hard drive.

(7) Digitize Audio (Block 39)

The saved song.kif file is copied to a floppy disk. This disk is then transferred to an Amiga computer system 61 (FIG. 2*b*) where the song.kif file is read and converted from MS-DOS format to Amiga format and renamed song.kiff. The Amiga computer system should be a model 3000 or 4000 running Amiga DOS 3.0 or higher with at least four (4) megabytes of RAM and forty (40) megabyte hard drive.

The DAT tape 13 from step (1) is used as the audio signal input to a digitizer 44 such as the Perfect Sound Digitizer manufactured by SunRize Industries, 2959 S. Winchester Blvd., Suite 204, Campbell, Calif. 95008. The digitized audio is stored to disk in a file 41 as song.kiff.audio. The Perfect Sound Digitizer includes appropriate software and connections for the Amiga computer with digitizer software supplied with the Perfect Sound Digitizer to create and save the song.kif.audio file.

(8) Set Start/End Times (Block 45)

During playback, a vertical line 53 moves from left to right through the displayed waveform on monitor 50 providing the operator with visual cues as to the location of the sound being played. Selecting each phrase in turn, the operator plays a portion of the audio attempting to locate its starting point. When found, the operator presses the left hand mouse button of mouse 48 and a marker appears directly below the spot on the waveform. The same process is used to locate the end of the phrase except that the right hand mouse button is used. The selected phrase can be replayed and if found to be in error, an edit mode allows the markers to be moved right or left (later or earlier in time). On exit the start/end times are added to the song.kiff file for use in step (10). The song.kiff file is copied to an MS-DOS floppy diskette where it is renamed song.kif for further processing on the IBM or compatible platform.

The set start/end times processing is performed by Digitizer/Synchronizer software which allows the operator to view the waveform from step (7) created from the digitized audio in file 41 which is displayed on monitor 50 and playback the digitized audio through DAT player 52. Digitizer/Synchronizer is a custom program written in Foundation. Foundation is available from Intuitive Technologies, 471 Lighthouse Avenue Pacific Grove, Calif. 93950.

Foundation is an authoring program published by Intuitive Technologies. At present Foundation only runs on Amiga platforms and this is the reason that Digitizer/Synchronizer runs on an Amiga platform. The main purpose of the Digitizer/Synchronizer program is to determine the starting and ending times for the phrases which comprise the song19 The Digitizer portion of the program does what its name implies. It converts an audio stream into a digitized waveform, a process well known to those versed in the art. The Synchronizer program allows the operator to view the digitized waveform along with the phrases which comprise the song and to set markers along the waveform where the phrases begin and end. The relative positions of these markers is then converted into a time code.

The Digitizer/Synchronizer program consists of two stacks which can be generated with a text editor and then input to the Foundation program to be compiled into a form executable by Foundation. The source code for these stacks is included in Appendix 1. There are other modules which are used by Digitizer/Synchronizer called xlibs. These are programs written in Foundation's language which extend the functionality of Foundation and are callable from Digitizer/Synchronizer. To increase the performance of the marker xlib, it was coded in C and linked into Digitizer/Synchronizer.

Functional description of Digitizer/Synchronizer:

The Digitizer component of the software has functions which allow the operator to:

(1) specify the record time in minutes and seconds;
(2) copy Amiga files to a PC DOS floppy diskette and vice-versa;
(3) monitor an audio source, i.e. to listen without recording;
(4) record an audio source;
(5) jump to the Synchronizer program;
(6) exit to Amiga DOS.

Each of these functions is associated with a window (or button) on the screen and is represented in the code by a frame.

The frame specifies the location and appearance of the button and includes the Foundation code to accomplish the button's function.

Like Digitizer, Synchronizer consists of frames. It is much larger and more complex however. There are frames to handle:

(i) key presses;
(ii) initialization;
(iii) searching for patterns;
(iv) resize windows;
(v) playback;
(vi) display phrases;
(vii) display and move markers;
(viii) handle thumbtack (slider);
(ix) display waveform;
(x) load and save kiff files;
(xi) display status;
(xii) print the kiff file;
(xiii) edit the kiff file;
(xiv) exit to Digitizer;
(xv) exit to Amiga DOS;
(xvi) miscellaneous.

Each of these functions are described below.

(i) key presses:

Return key: If Edit mode is on and no changes have been made, the key is ignored. Otherwise update the kiff list, undraw the bounding box, reinitialize flags and variables, turn off edit mode button and redraw markers.

Escape key: If in next cue mode, reinitialize previous start cue, update status display and redraw marker. If in edit mode, disregard any previous changes, reinitialize flags and variables, turn off edit mode and update the status display.

Left arrow key: If in modify, pass it through. Subtract one from the current frame and current offset. Moves the offset to object(1000). Sets flags to indicate changes made.

Right arrow key: If in modify, pass it through. Add one from the current frame and current offset. Moves the offset to object(1000). Sets flags to indicate changes made. Shift left arrow key: Performs left arrow key function. In addition, plays the current range.

Shift right arrow key: Performs right arrow key function. In addition, plays the current range.

Up arrow: Down Arrow: If in modify, pass it through.

F1–F9: If send.entry.msgs.copy, return else pass it through.

F10: If seq.list is zero, exit. Otherwise do dialog to obtain seq.list. If it's empty exit. Else search the kiff list for the key num. If the sequence hasn't been cued (timed) exit with a message.Allows the operator to jump to a specific cue (phrase) in the kiff list.

(ii) initialization:

Stack entry loads the xlibs (these functions are defined below):

Convert.Frame.to.MSF
Convert.MSF.to.Frame
IO.Functions
DisplayBox
Marker
Waveform
RadioBox3
Slider
SingleButton Frame.Entry is the entry point from the Digitizer. "Initializing" is put in the status display then do.hypertext is called to do the init of: waveform, marker, window size, play width, start msf, end msf and slider.

Init sound file: Checks to see if kiff filename is a valid file name then checks to see if there is a sound file associated with it. Initializes the slider, waveform and marker. Turns off accept and cancel if still on. Searches for starting sequence number.

(iii) searching for patterns:

Find next unmarked phrase: The code in this frame checks to see if already in next cue mode and if so exits. If the edit mode buttons are on they are turned off. A search is then made of the kiff list to find the next unmarked phrase. If one is not found, a message is posted and the frame is exited. Otherwise the phrase line number is moved to the status display and the data entry mode is turned on.

(iv) resize windows:

New window size: Utilizes do.hypertext to change the visible area of slider, waveform and marker. Other connections redraw the waveform, markers. The start and end of MSF are set.

(v) playback:

New play width: Changes the size of the play width from 5 sec to 10 sec. Calls radiobox functions init and set.state. See RadioBox3 xlib below for details.

play once: If no song loaded, exits. Otherwise invokes click.up or click.down in SingleButton xlib. See SingleButton xlib below for details.

play sound loop: If no song loaded, exits. Otherwise invokes click.up or click.down in SingleButton xlib. See SingleButton xlib below for details.

(vi) display phrases:

Next cue: Invokes find.next.unmarked.phrase (vii) display and move markers:

This frame contains invocations of entry points in marker.c. There are init, set.start.frame, set.visible.area, set.frame.rate, display.markers, draw.marker, redraw and click. See marker.c description below for particulars.

(viii) handle thumbtack (slider):

Uses do.hypertext to set the starting frame for the waveform and the marker. Displays the waveform, redraws the marker and sets the starting and ending MSF. Concludes with displaying the markers.

(ix) display waveform:

This frame contains invocations of entry points in the waveform xlib. They are set.start.frame, set.visible.area, display.waveform, draw.marker, right.click, left.click, right-.click.up and left.click.up. See waveform xlib below for details.

(x) load and save kiff files;

load kiff: If a song already loaded then prompts operator to prevent loss of data. On click up, gets the file name, stores it, loads the file, stores the kiff and inits the sound file. store kiff:

save kiff: If no song loaded, exits. Otherwise saves the kiff file.

extract kiff: Extracts the kiff file name from the filename string.

(xi) display status:

Converts frames to msf format end calls DisplayBox.

(xii) print the kiff file:

Puts up a dialog box to get the kiff file name. If it doesn't exist, exists. Proceeds to build a print list consisting of the start and end times. From these the formatted report is produced.

(xiii) edit the kiff file:

This frame allows the operator to use an Amiga editor to directly edit the kiff file. This presumes an experienced user of the system.

(xiv) exit to Digitizer:

Puts up "Are you sure?" and allows the operator to save any changes if there is a kiff file loaded. Determines the file name to save under and if possible saves the file along with a time stamp. Puts up a message on conclusion.

(xv) exit to Amiga DOS:

As in (xiv) exit to Digitizer, puts up "Are you sure?" and allows the operator to save any changes if there is a kiff file loaded. Determines the file name to save under and if possible saves the file along with a time stamp. Puts up a message on conclusion.

(xvi) miscellaneous:

Pos by seq: Invokes F10 frame.

Version: Displays the version number of the software.

Left arrow slider: While the button is selected, moves the slider to the left.

Right arrow slider: While the button is selected, moves the slider to the right.

Accept: If no song is loaded, returns. If a sequence number has been edited and changed, this frame accepts the new value, updates the kiff list, undraws the bounding box, resets flags and variables, turns off the edit button and redraws the screen with new markers.

Cancel: If no song is loaded, returns. Otherwise invokes escape frame.

Functional description of xlib modules:

As previously noted, the xlib modules are other modules which are used by Digitizer/Synchronizer which are programs written in Foundation's language which extend the functionality of Foundation.

Convert.Frame.to.MSF

Does the math to convert frames into minutes, seconds, frames according to the formula of 30 frames=1 second.

Convert.MSF.to.Frame

Does the math to convert minutes,seconds, frames into frames according to the formula of 30 frames=1 second.

IO.Functions

Given the path to request file from and a prompt, this xlib gets the name of the file. Contains modules that load and save a file and get a file name.

DisplayBox init: Puts 00:00:00 onto the object.

set.value: If no song loaded, returns. Puts _p1 into the object.

Waveform

Sets the constant which represents the sweep time and the visible area size. Contains entry points:

Set.start.frame set.visible.area display.waveform redraw rclick—calls play.short.range, sets last frame rclickup—if in next cue mode, sets the end time for the current cue. Updates the kiff list, resets the flags, redraws the marker and updates the status display.

lclick—calls play.short.range, sets last frame lclickup—if in next cue mode, sets the start time for the current cue. Updates the kiff list, redraws the marker, loads nextcue right cursor and plays the waveform.

play.wave.once play.wave.loop

RadioBox3

Performs radio box function for Synchronizer i.e. assures that one and only one button is turned on. If a button different from the high lighted button is selected the high lighted button must be turned off.

Slider

Entry points:

init—sets the top line, visible area and contents line count of the slider object set.position.sets new top line set.visible.area.sets the visible area to _p1 * framerate. new.position—if no song loaded, returns. Calculates the new position based on the left edge of the slidet and current window size. Turns off the edit button if on. If not in next cue mode and not loading a new kiff, updates the status display.

set.max—sets the contents line count of the slider to _p1.

SingleButton

Two entry points:

click.down and click.up invoke do.hypertext "click.down" or "click.up" of the object(me).

Marker

Consists of foundation code that presents an xlib interface and a C module that does the work.

The xlib interface contains the globals that describe the markers. Entry points are:

redraw—If no song loaded, returns. Otherwise clears the marker component of any markers or lyrics.

set.start.frame—sets _p1 into current.frame set.visible.area—puts _p1 into visible.area set.frame.rate—puts _p1 into frameRate display.markers—If no song loaded, returns. Sets starting frame, ending frame, frame total, frame ratio and text string for the marker then calls the kmarker xcode module.

edit.with.triangles—searches the triangle list to see if user clicked on a triangle location then sets edit mode and made change flags. If it was in next cue mode, turns off data entry mode. If editing new triangle and changes have been made to a previously selected triangle, beep to signal user that they must either select return/accept or escape/cancel. If editing a new triangle, but no previous triangle, undraw old bounding box and reset market offset to zero. If user wants to edit first triangle and no previous triangle, draw a bounding box and reset marker offset to zero.

Marker C Program

This module consists of a main program (called from the CLI or WB which initializes the framework for an Amiga program. It calls InitEnviron() to get the program environment initialized. InitEnviron also handles the argc/argv/WBenchMsg issues and inits the global vars associated with an (optional) input file. It then calls InitMsgSys() to initialize the message system and prepare for the program object to install the default message handlers. Below are the constituent functions of kmarker. c.

TermEnvirons()—terminates the environment by closing all the libraries.

HandleUCMsg(port)—Handles start/stop message from UltraCard.

InitEnvirons(argc,argv)—Opens the Amiga libraries and processes the optional input parameter to setup the global vars for handling an input file.

XAddWaitHandler(sigbit,port,handler)—Adds handler for a signal bit, specifies port & handler routine.

XDelWaitHandler(sigbit)—Deletes handler for a signal bit.

CreateXCodePort(name)—Creates XCode port so UltraCard can send a message.

InstallOurHandlers()—Install the handlers for the messages processed in this XCODE.

RemoveOurHandlers()—Remove the handlers (gracefully) for the messages processed.

Setup1()—Initialization for loop1.

Loop1()—Init list start.

Setup2()—Initialization for loop2.

Loop2()—Init list start.

Term()—Frees list start/end

FindNextPhrase(myparm)—Find the next line starting with '>' or '<' in myparm.

GetNextKiff()—sets the index to the character following the next new line character.

GetStartMSF()—based on found line in kiff.list, convert Start MSF to a frame.

GetEndMSF()—based on found line in kiff.list, convert End MSF to a frame.

DrawSeqNum(plot,clr)—displays the sequence number (calls TextDraw below).

TextDraw(text,tx,tplot,tcolor)—displays text by calling DrawSomeText.

CalcTextLen()—calculate total pixel size of sequence number, dash, and lyric text.

ClipText()—if text to be drawn won't fit, clip a char at a time until it will fit.

DrawPhrase()—Draw the lyric phrase preceded by the sequence number and a '—'.

AppendtoListStart()—append the bounding rectangle coordinates for MSF to the Start list.

AppendtoListEnd()—append the bounding rectangle coordinates for MSF to the End list.

MSFinWindow (result)—if MSF is in window return "TRUE", else return "FALSE".

MSFBeyondWindow(result)—if MSF is beyond window return "TRUE" , else return "FALSE".

ConvertMSFtoFrame(src, frameRate)—converts min, secs, frames to frames. Uses XStoreMSF below to store the string at src.

XStoreMSF(dst,src)—converts an ASCII string at src and stores 3 bytes: mins, secs, frames at dst.

SetGraphicFont()—sets the font.

DrawSomeText (color,x,y,s,n)—uses Amiga sys calls to display text.

(9) Create Title/Bridge Graphics (Block 47)

Using a paint program such as TipsPlus from Truevision, a title screen is created. If there are bridges (musical interludes without lyrics) suitable graphics may also be created. Each of these screens is converted to Truevision format and output as bridge.tga file 49 and title.tga file 51.

Using an ASCII editor, records are added to the song.kif file consisting of the following five (5) lines:

*titlsong

;right

>mm:ss:ff

<mm:ss:ff

GRAPHICS

The records are added to the song.kif file at each place in the file where a graphic is to be displayed. The records in the song.kif file contain fields specifying the start and end times for the phrase. If the time between phrases exceeds 15 seconds,. then a graphic may be displayed.

The first character must be as specified above. The asterisk (*) is followed by the DOS name of the graphics TGA file i.e., bridge.tga. Following the semicolon (;) is the name of the wipe to use i.e. the way in which the graphic is painted onto the screen (left, right, up, down spiral in, —in, etc.). Following the greater than (>) and less than (<) symbols are the start and stop times for the graphic in minutes, seconds and frames. Specifying these times is optional if the succeeding KIF record has a starting time. GRAPHICS (in all caps) must be included to distinguish this KIF record from textual records.

The processing performed in block 47 can be done before, during or after the processing performed in blocks 21, 31, 35, 37, 39 and 45). Preferably, the processing in block 47 is performed using personal computer 56, although, as is the case with all the computer processing performed as part of the present invention, any suitable platform may be used if the necessary software is available.

(10) Build Subcode File (Block 53)

Two more pieces of information are added to the song.kif file: the start time for each song and the vocal start time. The start time is taken from the work order 19 from step (2). The vocal start time is obtained by playing the window dub tape 17 from step (2) through VHS player 54 and noting the SMPTE time. The completed song.kif file contains the above-described data in the typedef struct specified above.

The following shows the header (first two lines) and three records of a typical KIF file:

| KIF file | Description |
|---|---|
| $SO4:17:03 | "in time"from mastering order |
| $VO4:29:10 | time of first lyric fill |
| *titlhelp | name of title TGA file |
| ;right | type of wipe |
| #1 | record number (added by KED) |
| GRAPHICS | graphics record indicator |
| *help1 | screen break and name of lyric TGA file |
| [36,364 | monitor 42 coordinates of the start of the phrase |
| ]90,364 | monitor 42 coordinates of the end of the phrase |
| @7,10 phrase | Subcode coordinates of the start of the |
| >00:01:19 Synchronizer) | starting time of the fill (from |
| >00:02:04 | ending time of the fill |
| #2 | record number (added by KED) |
| Help! | phrase |
| ]90,364 | monitor 42 coordinates of the start of the phrase |
| ]240,364 | monitor 42 coordinates of the end of the phrase |
| @16,10 phrase | Subcode coordinates of the start of the |
| >00:02:25 Synchronizer) | starting time of the fill (from |
| <00:03:18 | ending time of the fill |
| #3 | record number (added by KED) |
| I need somebody. | phrase |

It should be noted that if the first line of a record starts with an asterisk, this signifies a screen break, i.e. the screen is to be cleared. Additionally, if a name follows the asterisk, then it specifies the TGA file to be used to obtain the phrases. If no name is present, the previously specified TGA file is used.

The KED program described above includes a "Build" option which, if selected, results in prompts to the operator to enter the two times above, namely, the start time and the vocal start time. KED then constructs the subcode file 57 using the information contained in the song.kif file and the graphical data taken from the song.tga files. The result is a file which corresponds to the subcode data that will be placed in the final product. Records in the subcode file are organized according to the "redbook" specification for channels R through W.

(11) Simulate Playback (Block 61)

Starting the window dub tape 17 playing by VHS player 54 and selecting playback from the KED menu causes KED to await the SMPTE start time and at that time to read the subcode file 57 created in step (10) and send the data to the playback monitor 46 via a CD decoder box 58. A suitable CD decoder 58 is available from JVC, Model No. VS-G11. To interface the decoder to PC 56, a CD decoder interface board is needed. One suitable interface board is described in U.S. Pat. No. 4,942,551 as encoder interface 21. To obtain the SMPTE times from VHS player 54, PC 56 requires a SMPTE decoder board. A suitable SMPTE decoder board is available from Adrienne Electronics Corp. of Nevada City, Calif. as its model no. PC-LTC/RDR.

The operator then views the displayed text on playback monitor 46 and listens to the audio playback to verify that the fill of the text is in time to the music.

(12) Adjust Timings 63

If the text is not synchronized with the music, the operator can adjust the start times for all the phrases in the song by entering a budge factor (KED asks for a budge factor when the operator requests Playback from the KED menu) and rebuilding the subcode file 57 created in step (10). If a particular phrase time is in error, the operator can select the offending time by using the bitpad 36 as in step (6) and adjust the time up or down using the ± keys on the keyboard (not shown) of PC 56. The subcode file is then rebuilt and step (11) repeated.

(13) Assemble for CD Mastering 65

The final step in the authoring process is to combine the subcode files for each song in the volume into a single file. This is done using the ASSEM program and the work order from step (2).

ASSEM does this by pasting the subcode files end to end and inserting filler in order to have each file begin at the time specified by the mastering order. The source code for ASSEM is in Appendix 2.

We claim:

1. A system for encoding graphical cues on a compact disc, said graphical cues for displaying in association with corresponding text encoded on the compact disc, said system comprising:

a) a computer (56) including:

i) a hand manipulable device for inputting and pointing (36), ii) a keyboard for entering textual data;

ii) a storage medium (19,23,25,33,49,51,57), iii) a first video display and a second video display (40,42), iv) processing means for processing data input from said hand manipulable device, said keyboard and said storage medium and storing the processed data on said storage medium and displaying predetermined portions of the processed data on at least one of said first and second video displays, wherein results produced by said processing means stored on said storage medium include a first file (25) containing a line by line coded representation of text strings of lyrics corresponding to lyrics of a song to be sung;

b) extraction means (31) for instructing said processing means to process said first file by inserting screen breaks after a predetermined number of lines of text strings and producing a resulting second file (33);

c) set phrase block means (35) for instructing said processing means to process said second file (33) to define a plurality of phrase blocks by inserting carriage return and linefeed characters after each string of syllables in said lyrics that are sung without a break or pause;

d) set XY position and length of phrase block means (37) for instructing said processing means to process said second file, including said defined plurality of phrase blocks, to determine for each of said phrase blocks its length in characters and its starting point relative to a coordinate system on a graphic playback screen (46) for the compact disc;

e) means (44) for digitizing audio signals corresponding to scratch vocals;

f) means (45) for setting start times and end times for each of said phrase blocks to be displayed relative to a start time for each song processed, wherein said start and end time setting means provides an operator with a visual cue as to the location of sounds being played back corresesoonding to said phrase blocks as a vertical line (53) on a monitor (50), which vertical line moves from left to right through a displayed waveform corresponding to the sound being played back;

g) means for adding to said set start times and end times said start time and a vocal start time for each song processed;

h) subcode file build means (53) for instructing said processing means to create a subcode file (57) containing for each song processed packs of data representing the graphical cues including XOR packs which cause the text strings of lyrics to change color, said packs placed in the subcode file relative to the time when the graphical cue appears on said graphic playback screen.

2. A method for encoding graphical cues on a compact disc, said graphical cues for displaying in association with corresponding text encoded on the compact disc, said method comprising the steps of:

a) processing data input from:

i) a hand manipulable device coupled to a computer for inputting and pointing;

ii) a keyboard coupled to the computer for entering textual data; and b) storing the processed data on a storage medium coupled to the computer;

c) displaying predetermined portions of the processed data on at least one of a first video display (40) and a second video display (42) coupled to the computer;

wherein results produced by said processing step stored on said storage medium include a first file (25) containing a line by line coded representation of text strings of lyrics corresponding to lyrics of a song to be sung;

d) processing said first file by inserting screen breaks after a predetermined number of lines of text strings and producing a resulting second file (33);

e) defining a plurality of phrase blocks by inserting carriage return and linefeed characters after each string of syllables in said lyrics that are sung without a break or pause;

f) determining for each of said phrase blocks its length in characters and its starting point relative to a coordinate system on a graphic playback screen (46) for the compact disc;

g) digitizing audio signals corresponding to scratch vocals;

h) setting start times and end times for each of said phrase blocks to be displayed relative to a start time for each song processed, wherein said start and end time setting step provides an operator with a visual cue as to the location of sounds being played back corresponding to said phrase blocks as a vertical line (53) on a monitor (50), which vertical line moves from left to right through a displayed waveform corresponding to the sound being played back;

i) adding to said set start times and end times said start time and a vocal start time for each song processed;

j) creating a subcode file (57) containing for each song processed packs of data representing the graphical cues including XOR packs which cause the text strings of lyrics to change color, said packs placed in the subcode file relative to the time when the graphical cue appears on said graphic playback screen.

* * * * *

UNITED STATES PATENT AND TRADEMARK OFFICE
CERTIFICATE OF CORRECTION

PATENT NO. : 5,649,234

DATED : July 15, 1997

INVENTOR(S) : Klappert et al.

It is certified that error appears in the above-identified patent and that said Letters Patent is hereby corrected as shown below:

In column 3 at line 1, please delete " specifying " and insert -- layout file specifying --.

In column 6 at line 60, please delete " clears line " and insert -- clears line 24 --.

In column 8 at line 33, please delete " Start set " and insert -- Start_set --.

In column 8 at line 43, please delete " bios build time " and insert -- bios_build_time --.

In column 13 at line 19, please delete " song19 "and insert -- song. --.

In column 16 at line 49, please start a new paragraph with the word " set," (both occurrences).

In column 16 at line 49, please insert " -- " after the word " position. "

UNITED STATES PATENT AND TRADEMARK OFFICE

CERTIFICATE OF CORRECTION

PATENT NO. : 5,649,234
DATED : July 15, 1997
INVENTOR(S) : Klappert, et. al.

It is certified that error appears in the above-identified patent and that said Letters Patent is hereby corrected as shown below:

In column 16 at line 50, please insert "--" after the word "area".

Signed and Sealed this

Thirtieth Day of June, 1998

Attest:

Bruce Lehman

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,649,234

DATED : July 15, 1997

INVENTOR(S) : Klappert et al.

It is certified that error appears in the above-identified patent and that said Letters Patent is hereby corrected as shown below:

In column 2 at line 67, please delete " song " and insert -- song) --

Signed and Sealed this

Twenty-first Day of July, 1998

Attest:

Bruce Lehman

BRUCE LEHMAN

*Attesting Officer*

*Commissioner of Patents and Trademarks*